United States Patent
Hopkins

(12) 
(10) Patent No.: US 7,246,920 B1
(45) Date of Patent: Jul. 24, 2007

(54) PORTABLE LIGHT SOURCE INCLUDING WHITE AND ULTRAVIOLET LIGHT SOURCES

(76) Inventor: Timothy Nevin Hopkins, 712 Pinoak Cir., LaVergne, TN (US) 37086

( * ) Notice: Subject to any disclaimer, the term of this patent is extended or adjusted under 35 U.S.C. 154(b) by 203 days.

(21) Appl. No.: 10/860,301

(22) Filed: Jun. 3, 2004

Related U.S. Application Data

(63) Continuation-in-part of application No. 10/465,145, filed on Jun. 19, 2003.

(51) Int. Cl.
*B60Q 1/00* (2006.01)
*F21V 1/00* (2006.01)
*F21V 9/00* (2006.01)
*F21V 21/00* (2006.01)
*F21V 21/30* (2006.01)
*F21S 8/00* (2006.01)

(52) U.S. Cl. .................. 362/287; 362/231; 362/421; 362/397; 362/540

(58) Field of Classification Search ............... 362/477, 362/397, 231, 421, 287
See application file for complete search history.

(56) References Cited

U.S. PATENT DOCUMENTS

| 3,838,267 | A | 9/1974 | Eggers et al. | |
| 5,175,437 | A | 12/1992 | Waluszko | |
| 5,339,225 | A | 8/1994 | Wiggerman | |
| 5,491,621 | A | 2/1996 | Duty | |
| 5,504,342 | A | 4/1996 | Jaynes et al. | |
| 6,174,078 | B1 * | 1/2001 | Ohm et al. | 362/477 |
| D458,339 | S | 6/2002 | Cheong | |
| 6,474,851 | B1 * | 11/2002 | Baley | 362/477 |
| 6,585,392 | B2 * | 7/2003 | Shiau et al. | 362/231 |
| 6,644,829 | B1 * | 11/2003 | Tracy et al. | 362/220 |
| 6,808,287 | B2 * | 10/2004 | Lebens et al. | 362/184 |
| 2005/0047130 | A1 * | 3/2005 | Waters | 362/231 |
| 2005/0265035 | A1 * | 12/2005 | Brass et al. | 362/451 |

* cited by examiner

*Primary Examiner*—John Anthony Ward
*Assistant Examiner*—David Makiya
(74) *Attorney, Agent, or Firm*—Eric Karich

(57) ABSTRACT

A portable light source has a base, an attachment mechanism adapted for removably attaching the base to a surface, and a substantially tubular arm pivotally connected to the base such that it can pivot between a horizontal position and a vertical position. A white light source and an ultraviolet light source are positioned within the arm and operably connected to a rechargeable battery to emit white light and ultraviolet light in outward directions from the arm.

1 Claim, 2 Drawing Sheets

PORTABLE LIGHT SOURCE INCLUDING WHITE AND ULTRAVIOLET LIGHT SOURCES

CROSS-REFERENCE TO RELATED APPLICATIONS

This application for a utility patent is a continuation-in-part of a previously filed utility patent having the application Ser. No. 10/465,145, filed Jun. 19, 2003. This application is incorporated herein by reference in full.

BACKGROUND OF THE INVENTION

1. Field of the Invention

This invention relates generally to portable light sources, and more particularly to a portable light source that includes a white light and a vertical black light, and is particularly suited for night fishing.

2. Description of Related Art

In locations where the sun shines brightly for several hours during the day and water temperatures rise to levels game fish find uncomfortable, the game fish are typically most active during low light periods and retreat to deeper water during the heat of the day. At the same time, fishing in bright sunlight on a hot day quickly becomes uncomfortable for fishermen, and also requires that all exposed skin be carefully and adequately protected from prolonged exposure to the sun.

For this and other reasons, many fishermen in such locations prefer to fish at night. At the same time, fishing is a very visual activity. Sources of light capable of illuminating large areas are prohibitively heavy and bulky, and bright visible light tends to attract bothersome insects. On the other hand, viewing a large area illuminated by a relatively weak source of normal or "white" light (e.g., a flashlight) is often frustratingly difficult and quickly leads to eye strain and fatigue.

Fisherman have discovered that most monofilament fishing line is fluorescent, and glows brightly in the dark even under relatively low energy sources of "black" (ultraviolet or UV) light. In addition, high visibility monofilament fishing lines with additional levels of phosphors that fluoresce in strong sunlight and/or UV light have been developed to meet the demands of fishing conditions when highly visible line is needed. (As the sources of UV light are relatively weak and water absorbs UV light, portions of monofilament line under water are typically invisible.)

Fisherman often rely on visual detection of line movement, rather than physical tugs on the line, to detect fish running with baits. Monofilament fishing line glowing brightly in the dark under UV light is easy to see. In addition, tying or otherwise connecting lures to the brightly glowing monofilament line is made easier. Further, many fishermen report that when fishing at night with a black light depth perception is improved and eye strain and fatigue are reduced.

While UV light advantageously makes monofilament fishing line glow brightly in the dark, it is often easier to perform some activities, such as selecting tackle from a tackle box, using white light illumination (e.g., from a flashlight).

It would thus be advantageous to have a portable light source capable of producing both white light and UV light. In addition, as many fishermen fish from boats, it would be advantageous for such a portable light source to be adapted for removable attachment to a surface of a boat.

SUMMARY OF THE INVENTION

A portable light source is disclosed including a substantially tubular arm having an end pivotally connected to a base. A white light source and an ultraviolet light source positioned within the arm are operable to emit light in outward directions from the arm.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
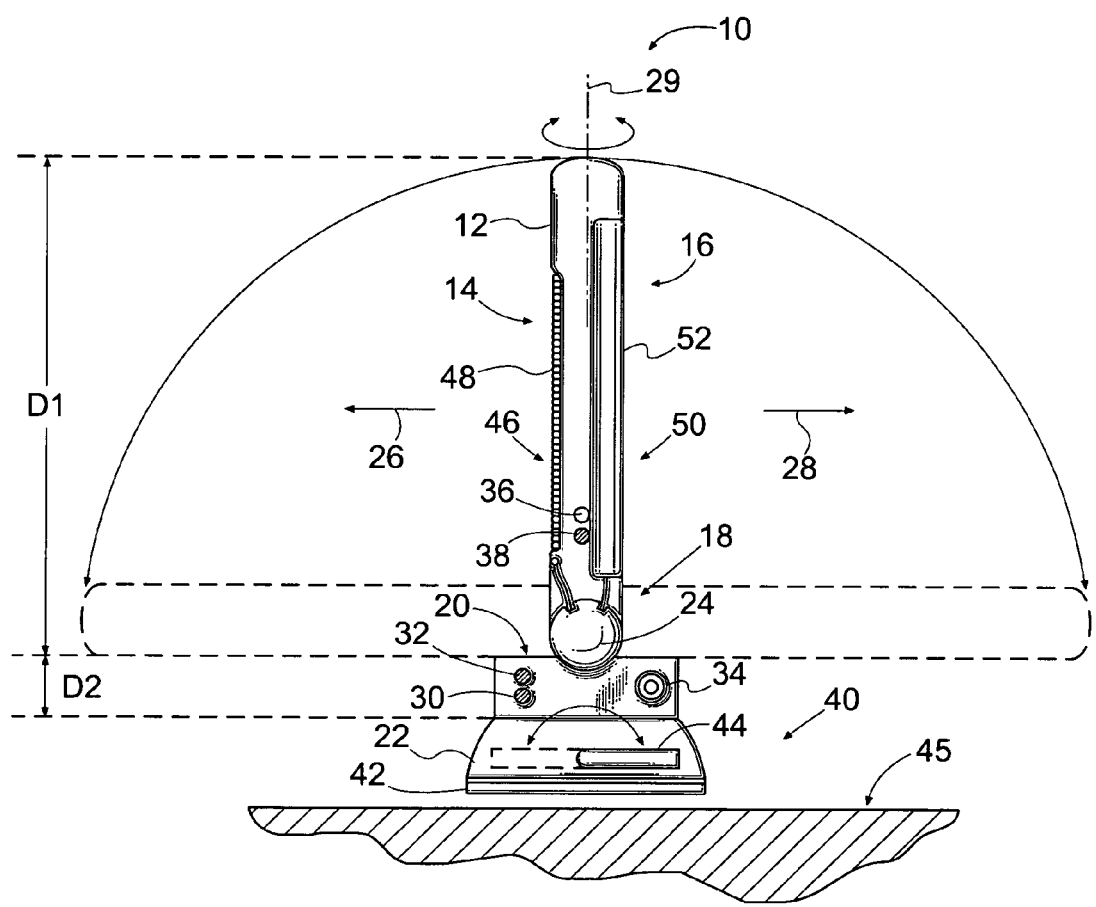
FIG. 1 is a front elevation view of one embodiment of a portable light source including an arm housing a white light source and an ultraviolet (UV) light source.

FIG. 1 is a front elevation view of one embodiment of a portable light source 10 including a substantially tubular arm 12 housing a white light source 14 and an ultraviolet (UV) light source 16. In the embodiment of FIG. 1 the arm 12 is substantially tubular and has an end 18 pivotally connected to an upper portion of a base 22, preferably via a ball-and-socket joint (i.e., ball joint) 24. The white light source 14 is positioned within the arm 12 and, when enabled, emits white light in an outward direction 26 from the arm 12. The UV light source 16 is also positioned within the arm 12 and, when enabled, emits UV light in an outward direction 28 from the arm 12, wherein the direction 28 is substantially opposite the direction 26.

The ball joint 24 advantageously allows the arm 12 to pivot up to about 90 degrees from vertical with respect to a top surface 20 of the base 22 in all directions as indicated in FIG. 1. In addition, at any given orientation of the arm 12 with respect to the top surface 20 of the base 22, the ball joint 24 allows the arm 12 to be rotated about a central axis 29 as indicated in FIG. 1. Functionally, the ball joint 24 enables the substantially tubular arm 12 to pivot between a horizontal position and a vertical position.

In the embodiment of FIG. 1, and as described in more detail below, the base 22 houses a rechargeable battery for powering the white light source 14 and the UV light source 16, a battery condition monitoring circuit for monitoring a charge level of the battery, a green light emitting diode (LED) 30 for indicating an adequate charge level of the battery, and a red LED 32 for indicating an inadequate charge level of the battery. The base 22 also houses a battery charging socket 34 for receiving electrical power from an external source, a battery charging circuit for using the electrical power from the external source to charge the battery, a first power conditioning circuit for the white light source 14, a second power conditioning circuit for the UV light source 16, and a voltage detector circuit for detecting the application of battery voltage to either the white light source 14 or the UV light source 16. In addition to the white light source 14 and the UV light source 16, the arm 12 houses a toggle switch 36 and a red LED 38.

In the embodiment of FIG. 1, the base 22 includes an attachment mechanism 40 positioned at a bottom surface of the base 22 and adapted for removably attaching the base 22 to a surface. In the embodiment of FIG. 1, the attachment mechanism 40 is a suction cup mechanism including a suction cup 42 operated by a lever 44. The attachment mechanism 40 of FIG. 1 may be used to removably attach the portable light source 10 to, for example, a substantially flat surface 45 such as a deck of a boat.

Other attachment mechanisms are possible and contemplated, and should be considered within the scope of the claimed invention. For example, in other embodiments the attachment mechanism 40 may be a clamping mechanism for removably attaching the portable light source 10 to, for example, an edge of a surface of a boat such as a gunwale. The attachment mechanism could also include an ordinary suction cup, hooks and loops fasteners such as VELCRO®, or any other attachment device known in the art or obvious to one skilled in the art.

In the embodiment of FIG. 1 the arm 12 has a first slit 46 adjacent to, and substantially aligned with, the white light source 14. In general, the white light produced by the white light source 14 has wavelengths between about 400 and approximately 700 nanometers, and exits the arm 12 in the direction 26 via the first slit 46.

The slit 46 is covered by a cover 48 substantially transparent to the white light produced by the white light source 14. The cover 48 may be made of, for example, a plastic material or a rugged type of glass. Suitable plastic materials include acrylic plastic resins such as Plexiglas® (Atofina Chemicals, Inc., Philadelphia, Pa.) and polycarbonate resins such as Lexan® (General Electric Company, Schenectady, N.Y.). Suitable rugged types of glass includes borosilicate glass such as Pyrex® (Corning Inc., Corning, N.Y.).

In the embodiment of FIG. 1 the arm 12 has a second slit 50 adjacent to, and substantially aligned with, the UV light source 16. In general, the UV light source 16 produces UV light having wavelengths between about 200 and approximately 400 nanometers. The UV light source 16 preferably produces UV light having wavelengths in the UV-A region between about 300 and approximately 400 nanometers. The UV light produced by the UV light source 16 exits the arm 12 in the direction 28 via the second slit 50.

The slit 50 is covered by a cover 52 substantially transparent to the UV light produced by the UV light source 16. The cover 52 may be made of, for example, a plastic material or a rugged type of glass. Suitable plastic materials include acrylic plastic resins such as Plexiglas® (Atofina Chemicals, Inc., Philadelphia, Pa.) and polycarbonate resins such as Lexan® (General Electric Company, Schenectady, N.Y.). Suitable rugged types of glass includes borosilicate glass such as Pyrex® (Corning Inc., Corning, N.Y.).

In the embodiment of FIG. 1, the white light source 14 includes multiple LEDs. The LEDs may include white LEDs and/or red, green, and blue LEDs. In other embodiments the white light source 14 may include, for example, one or more incandescent or fluorescent lamps or tubes producing white light.

In the embodiment of FIG. 1, and as described in more detail below, the UV light source 16 includes a cylindrical black light lamp or tube. In other embodiments the UV light source 16 may include, for example, one or more incandescent UV lamps or UV LEDs. While black light tubes have acceptably long expected lives (5,000 to 10,000 hours), their glass tubes are vulnerable to damage caused by shock, vibration, and sudden liquid contact. Advantages of UV LEDs over black light tubes include increased ruggedness and longer lives (50,000 to 100,00 hours).

In the embodiment of FIG. 1 the arm 12 has a length dimension D1 of about 16 inches and an upper portion of the base 22 has a height dimension D2 of about 2 inches. The upper portion of the base 22 houses the green LED 30, the red LED 32, and the battery charging socket 34.

Figure 2:
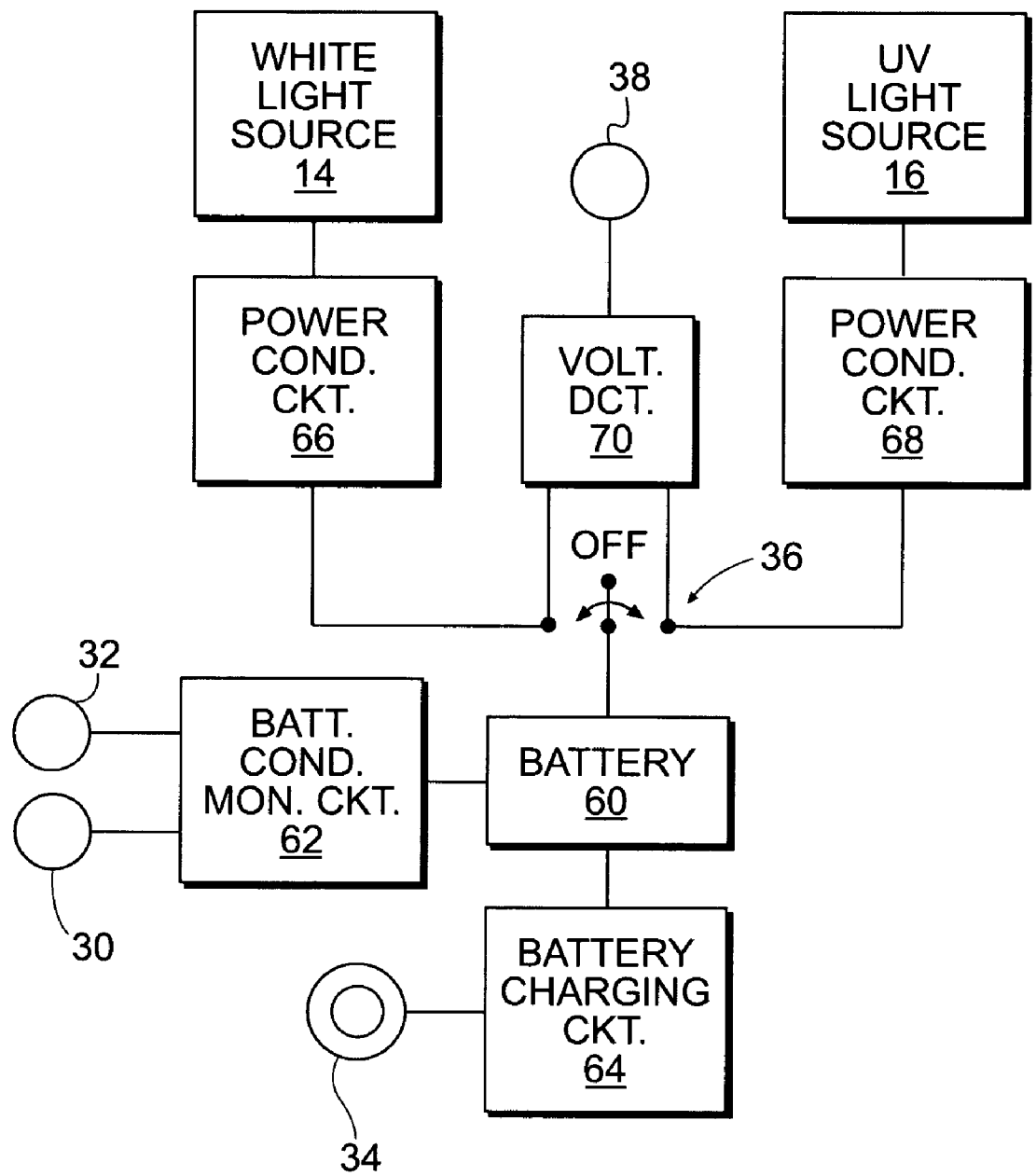
FIG. 2 is a diagram of an electric circuit formed in the portable light source of FIG. 1.

FIG. 2 is a diagram of an electric circuit formed in the portable light source 10 of FIG. 1. In FIG. 2, the rechargeable battery described above is labeled 60, the battery condition monitoring circuit is labeled 62, the battery charging circuit is labeled 64, the power conditioning circuit for the white light source 14 is labeled 66, the power conditioning circuit for the UV light source 16 is labeled 68, and the voltage detector circuit is labeled 70.

The battery condition monitoring circuit 62 monitors the charge level of the battery 60. The battery condition monitoring circuit 62 lights the green LED 30 when the charge level of the battery is adequate, and the red LED 32 when the charge level of the battery is inadequate. The battery charging circuit 64 receives electrical power from an external source via the battery charging socket 34 and uses the electrical power to charge the battery 60.

In the embodiment of FIG. 2 the toggle switch 36 has 3 positions. In a first position electrical voltage and current are applied to the power conditioning circuit 66 for the white light source 14. In a second position electrical voltage and current are applied to the power conditioning circuit 68 for the UV light source 16. A third position is an "OFF" position wherein electrical voltage and current are not applied to either the power conditioning circuit 66 or to the power conditioning circuit 68.

The voltage detector circuit 70 is coupled to the first and second positions of the toggle switch 36, and lights the red LED 38 when electrical voltage is applied to either the power conditioning circuit 66 or to the power conditioning circuit 68.

The power conditioning circuit 66 conditions electrical power from the battery 60 via the toggle switch 36. In general, the power conditioning circuit 68 produces electrical voltage and current required by the white light source 14 for proper starting and operation. In the embodiment of FIGS. 1 and 2, the white light source 14 includes multiple LEDs coupled in series and/or in parallel, and the power conditioning circuit 66 may limit the electrical current and/or voltage provided to the LEDs such that the LEDs do not draw excessive electrical power and fail prematurely.

The power conditioning circuit 68 conditions electrical power from the battery 60 via the toggle switch 36. In general, the power conditioning circuit 68 produces electrical voltage and current required by the UV light source 16 for proper starting and operation. In the embodiment of FIGS. 1 and 2, the UV light source 16 includes a cylindrical black light lamp or tube, and the power conditioning circuit 68 produces electrical voltage and current required by the black light lamp or tube for proper starting and operation. The power conditioning circuit 68 may be, for example, an electronic ballast commonly referred to as a direct current (dc) inverter ballast.

A typical electronic ballast provides a high voltage pulse to strike an arc in the black light tube, then regulates electrical current provided to the tube after starting. The typical electronic ballast drives the black light tube with high frequency voltage and current waveforms that increase efficiency and eliminate flicker. It is noted that other types of ballasts may be used, including magnetic ballasts.

A typical black light lamp or tube is a glass tube having two tungsten filament cathodes at opposite ends. The tube is filled with mercury vapor and other gases. When a sufficiently high voltage is applied between the two cathodes, an electric arc is produced. The electrons in the arc collide with mercury atoms resulting in the generation and emission of UV photons.

The filament cathodes of the typical black light tube extend between a pair of pins at each end of the tube. Each of the pairs of pins is adapted to fit into a bi-pin base. The ballast providing electrical power to the black light tube preheats the cathodes to start the tube. This starting method is generally referred as the "rapid start" method.

After the arc is struck within the black light tube during starting, the electrical resistance of the ionized gas within the tube decreases significantly. The ballast controls the electrical current provided to the black light tube after starting such that the tube does not draw excessive electrical power and fail prematurely.

Suitable black light lamps or tubes are commercially available, and include products with general designations F4T5BLB and F6T5BLB manufactured by the Sylvania Corp. (Danvers, Mass.). These black light tubes have widths of about 5/8 inch. The F4T5BLB black light tube has an overall length of about 6 inches. The F6T5BLB black light tube has an overall length of about 9 inches, dissipates more electrical power than the F4T5BLB, and produces more UV light than the F4T5BLB. Suitable small dc inverter ballasts are commercially available.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A portable light source adapted to be removably attached to a surface, the portable light source comprising:
   a base having a top surface;
   an attachment mechanism attached to the base and adapted for removably attaching the base to the surface;
   a substantially tubular arm hang opposing ends and a central axis;
   a ball-and-socket joint formed between only one of the ends of the substantially tubular arm and the top surface of the base such that the substantially tubular arm is pivotally connected to the base and can pivot 90 degrees in any direction with respect to the top surface of the base, between a horizontal position and a vertical position, and can also rotate about the central axis;
   a white light source positioned within the arm and operable to emit white light in an outward direction through a first slit in the arm;
   an ultraviolet light source positioned within the arm and operable to emit ultraviolet light in an outward direction through a second slit in the arm;
   a rechargeable battery operably connectable to the white light source and the ultraviolet light source; and
   wherein the first slit and the second slit are positioned on substantially opposite sides of the arm, such that the white light and the ultraviolet light exit the arm in substantially opposite directions.

* * * * *